United States Patent

Shikatani et al.

[11] Patent Number: 5,006,633
[45] Date of Patent: Apr. 9, 1991

[54] NOVEL COMPOLYMERS AND ELECTROACTIVE POLYMERS DERIVED THEREFROM

[75] Inventors: Yutaka Shikatani; Naoki Kataoka; Yoshiyuki Shimo; Nobuyuki Kuroda, all of Kanagawa; Kazuo Matsuura, Tokyo, all of Japan

[73] Assignee: Nippon Oil Company, Limited, Tokyo, Japan

[21] Appl. No.: 395,803

[22] Filed: Aug. 18, 1989

[30] Foreign Application Priority Data

Aug. 31, 1988 [JP] Japan .................. 63-214843

[51] Int. Cl.[5] ............................. C08G 12/06
[52] U.S. Cl. ......................... 528/230; 528/247; 528/266; 528/269
[58] Field of Search ............. 528/230, 247, 266, 269

[56] References Cited

U.S. PATENT DOCUMENTS 4,124,565 11/1978 Kuczkowski ............... 524/236

FOREIGN PATENT DOCUMENTS 206170 3/1985 Japan .

Primary Examiner—John Kight, III
Assistant Examiner—S. A. Acquah
Attorney, Agent, or Firm—Scully, Scott, Murphy & Presser

[57] ABSTRACT

An electroactive polymer is obtained by doping a copolymer represented by the following general formula (I):

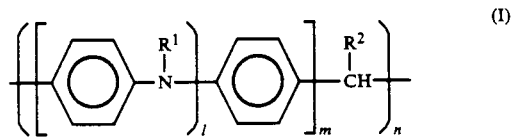

wherein $R^1$ is hydrogen or a hydrocarbon residue having 1 to 20 carbon atoms; $R^2$ is hydrogen, a hydrocarbon residue having 1 to 20 carbon atoms, furyl, pyridyl, nitrophenyl, chlorophenyl, or methoxyphenyl; l is an integer not smaller than 2; m is an integer not smaller than 1; and n is an integer not smaller than 2.

3 Claims, 2 Drawing Sheets

NOVEL COMPOLYMERS AND ELECTROACTIVE POLYMERS DERIVED THEREFROM

BACKGROUND OF THE INVENTION

The present invention relates to a novel polymer, particularly a novel electroconductive polymer and a precursor thereof.

As polymers used for forming electroconductive polymers there are known polyacetylenes, polyparaphenylenes, polythiophenes and polypyrroles. These polymers become employable as electroconductive polymers by being doped using certain kinds of compounds. However, the electroconductive polymers thus obtained are apt to change in quality, especially in electrical characteristics, in the air. Further, those polymers are poor in meltability and solubility so are extremely inferior in processability. These drawbacks are serious obstacles to their practical use. For example, as an application of such electroconductive polymers there has been proposed an application to electrodes for a secondary battery utilizing their reversible redox characteristic. In most cases, however, they are unstable physically or chemically in the electrolyte of a secondary battery. Therefore, it is impossible to expect a stable cyclability of charge and discharge which is a basic performance required for a secondary battery. Besides, electroconductive polymers are insoluble and unmeltable because their skeletons are each constituted by a rigid $\pi$ electron conjugated system, and this point is also a serious obstacle to their practical use.

As a solution to the above problems it is proposed in Japanese Patent Laid-Open No. 206170/1986 to use as the electrode material for a secondary battery an electroactive polymer obtained by doping a polymer which has a 4,4'-diphenylamine structure as a repeating unit, using an electron acceptor or donor.

However, such diphenylamine a polymer is an oligomer of a low polymerization degree, lacking in mechanical strength and moldability which the polymer should possess as a high polymer. For example, in case of using this polymer as the electrode material for a secondary battery, a soluble component will dissolve out with repetition of charge and discharge, so it is impossible to expect a stable cyclability.

Moreover, in order to impart mechanical strength and moldability to the above diphenylamine polymer in addition to good electrochemical characteristics, it is necessary to obtain a polymer which is higher in the degree of polymerization (a high polymer). But it is difficult to obtain a high polymer even according to any of processes commonly used for the preparation of polyaromatic or polyheteroaromatic compounds, such as Grignard coupling, oxidative coupling, Friedel-Crafts reaction and electrolytic oxidation polymerization. Even under severer reaction conditions, not only it is impossible to expect the realization of a higher molecular weight due to an induced hetero-linkage or cross-linking reaction, but also the polymer becomes incapable of dissolving and melting with loss in processability which processability is one of the advantages of high polymers. Further, the polymer becomes inactive electrically.

For overcoming the above-mentioned drawbacks of the prior art, the present inventors have already found out and proposed copolymers represented by the following general formula:

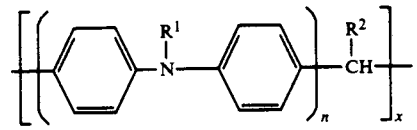

which copolymers are soluble in such solvents as N-methylpyrrolidone, nitrobenzene and sulfuric acid, superior in moldability because of thermoplastic resins, and are improved in their electroactivity by being doped using electron accepting compounds, thus permitting a redox reaction to be carried out in good cyclability, so are expected for their application to various electronic devices and batteries.

However, the above copolymers involve the problem that when applied to battery electrodes, the charge/discharge capacity per electrode active material weight becomes small. Therefore, improvement in this point has been desired.

SUMMARY OF THE INVENTION

It is the object of the present invention to remedy the above-mentioned drawbacks of the prior art.

Having made further extensive studies for remedying those drawbacks, the present inventors found out that the drawbacks in question could be overcome by using a copolymer represented by the following general formula (I), and thereby reached the present invention.

In one aspect the present invention resides in a copolymer represented by the general formula (I):

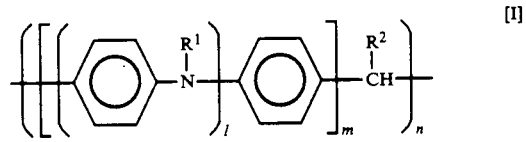

wherein $R^1$ is hydrogen or a hydrocarbon residue having 1 to 20 carbon atoms, $R^2$ is hydrogen, a hydrocarbon residue having 1 to 20 carbon atoms, furyl, pyridyl, nitrophenyl, chlorophenyl, or methoxyphenyl, l is an integer not smaller than 2, m is an integer not smaller than 1, and n is an integer not smaller than 2.

In another aspect the present invention resides in an electroactive polymer obtained by doping a copolymer of the general formula (I), using an electron acceptor.

DETAILED DESCRIPTION OF THE INVENTION

The copolymer of the present invention represented by the general formula (I) can be prepared by polycondensation of a compound represented by the following general formula (III) and an aldehyde, or a polymer thereof, represented by the following general formula (IV):

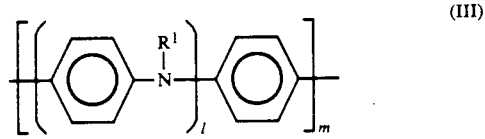

In the above general formula (III), $R^1$ is hydrogen or a hydrocarbon residue having 1 to 20, preferably 1 to 8, carbon atoms. As examples of such hydrocarbon residue there are mentioned alkyl groups such as methyl, ethyl, n-propyl, i-propyl, n-butyl, i-butyl and n-hexyl, allyl, aryl groups such as phenyl, tolyl and ethylphenyl aralkyl, and derivatives hereof.

Further, in the above general formula (III), l is 2 or more, usually 2 to 50, preferably 2 to 10, more preferably 2 to 5, and m is 1 or more, usually 1 to 50, preferably 1 to 30, more preferably 1 to 10. Both ends in the formula are not particularly specified, but usually they are nuclear-substituted hydrogens.

Examples of compounds represented by the general formula (III) include N,N'-diphenyl-p-phenylenediamine compounds and N-phenyl-N'-(4-phenylamino)-phenyl-p-phenylenediamine compounds.

Among the compounds represented by the general formula (III), those wherein m is not smaller than 2 are usually prepared by subjecting the compounds of the same general formula wherein m is 1 to an oxidative coupling reaction or electrolytic oxidation polymerization using an oxidizing agent such as a manganese compound or a ferric iron salt. For example, where the compounds of the general formula (III) are N,N'-diphenyl-p-phenylenediamine compounds, they can be prepared by subjecting N,N'-diphenyl-p-phenylenediamines to an oxidative coupling reaction using ferric chloride as a catalyst in a solvent such as, for example, ethanol, acetone, acetonitrile, ether or benzene. In this case, the reaction can be conducted at a temperature in the range from $-50°$ C. to $100°$ C., preferably from $-20°$ C. up to the boiling point of the solvent used, for a period of time in the range from 10 minutes to 100 hours, preferably from 1 to 50 hours.

As typical examples of such N,N'-diphenyl-p-phenylenediamines, mention may be made of N,N'-dimethyl-N,N'-diphenyl-p-phenylenediamine, N,N'-diphenyl-N,N'-diphenyl-p-phenylenediamine and N,N'-dipropyl-N,N'-diphenyl-p-phenylenediamine.

Among the compounds represented by the general formula (III), those other than the N,N'-diphenyl-p-phenylenediamine compounds may be prepared by known processes such as a process for reacting an aromatic amine and an aromatic hydroxy compound in an organic solvent in the presence of a transition metal catalyst or a process using an ester of phthalic acid as a starting compound. They are disclosed, for example, in Japanese Patent Laid 38311/1980, Journal of Polymer Science Part C 22 p.451(1968).

As the aldehyde represented by the general formula (IV) there is used a compound of the same formula wherein $R^2$ is hydrogen, a hydrocarbon residue having 1 to 20, preferably 1 to 8, carbon atoms, furyl, pyridyl, nitrophenyl, chlorophenyl, or methoxyphenyl. As examples of such hydrocarbon residue are mentioned alkyl groups such as methyl, ethyl, n-propyl, i-propyl, n-butyl, i-butyl and n-hexyl, allyl, aryl groups such as phenyl, tolyl and ethylphenyl, aralkyl, and derivatives thereof. Typical examples of such aldehyde are formaldehyde, acetaldehyde, propionaldehyde, butylaldehyde, banzaldehyde, acrylaldehyde, cinnamaldehyde, anisaldehyde, nitrobenzaldehyde and furfural.

"A polymer of the aldehyde" represents a polymer obtained by self-condensation of a concentrated solution of an aldehyde of the general formula (IV) or by condensation of the aldehyde in the presence of an acid catalyst. The said polymer should hydrolyze easily under the reaction conditions for the preparation of the copolymer of the present invention to produce an aldehyde monomer. Typical examples are paraformaldehyde which is a polymer of formaldehyde and paraaldehyde which is a trimer of acetaldehyde.

The polycondensation of a polymer of the general formula (III) and an aldehyde of the general formula (IV) can be conducted using an acid or alkali catalyst in an organic solvent in which both are soluble, at a temperature of $0°$ to $200°$ C. Examples of acid catalysts include inorganic acids such as sulfuric, hydrochloric, phosphoric and perchloric acids as well as diphosphorus pentoxide, and organic acids such as formic, acetic, propionic, methanesulfonic and ptoluenesulfonic acids. These acid catalysts may be used each alone or in combination of two or more. Preferred examples of organic solvents are ethers such as ethyl ether, tetrahydrofuran and dioxane, halogenated hydrocarbons such as chloroform, dichloromethane and chlorobenzene, nitro compounds such as nitrobenzene, as well as acetonitrile, propylene carbonate, dimethylformamide and N-methylpyrrolidone. The reaction time can be selected suitably in the range of 1 minute to 500 hours, preferably 5 minutes to 200 hours.

The copolymer of the general formula (I) thus obtained possesses substantially a linear structure, in which n is not smaller than 2, usually in the range of 2 to 1,000, preferably 5 to 200.

The copolymer of the present invention is soluble in such solvents as N-methylpyrrolidone, nitrobenzene, chloroform and sulfuric acid, but insoluble in alcohols, aliphatic hydrocarbons, propylene carbonate and acetonitrile used in an organic electrolyte type battery. It is a thermoplastic resin capable of being melted on heating, superior in processability and capable of being formed into products of desired shapes.

By being doped using an electron acceptor as a dopant, the copolymer of the present invention exhibits a high electroactivity and permits a redox reaction to be performed in good repeatability; besides, because of a high electroconductivity thereof, it can be applied to various electronic devices. For example, when the copolymer of the present invention is used as the electrode material of a secondary battery, it is possible to effect reversible charge and discharge. Even when the number of repetitions (the number of cycles) of charge and discharge is increased to a great extent, there can be obtained extremely stable characteristics without the occurrence of such a dissolving out phenomenon which is induced in the use of a diphenylamine polymer.

As examples of electron accepting dopants are mentioned iodine, bromine, halides, e.g., hydrogen iodide, metal halides such as arsenic pentafluoride, phosphorus pentachloride, phosphorus pentafluoride, antimony pentafluoride, silicon tetrafluoride, aluminum chloride, aluminum bromide, aluminum fluoride and ferric chloride, protic acids such as sulfuric, nitric and chlorosulfonic acids, oxidants such as sulfur trioxide and difluorosulfonyl peroxide, and organic materials, e.g., tetracyanoquinodimethane. As examples of dopants which permit electrochemical doping there are mentioned anions such as halide anions of Group Va elements, e.g., $PF_6^-$, $SbF_6^-$, $AsF_6^-$, halide anions of Group IIIa elements e.g., $BF_4^-$, halogen anions, e.g., $I^-(I_8^-)$, $Br^-$, $Cl^-$, and perchloric acid anions, e.g., $ClO_4^-$.

The doping using any of such dopants is carried out in a known manner. Typical examples of known doping methods include a vapor-phase doping method wherein the copolymer of the present invention is exposed to a vapor atmosphere of an electron accepting dopant in the case where the dopant is gas or has a high vapor pressure; a wet doping method wherein the copolymer is immersed in a solution of an electron accepting dopant in an inert solvent; a doping method wherein the copolymer is dissolved in a solution of an electron accepting compound in an inert solvent, then film or coating is formed from the said solution according to a dry film forming method and at the same time there is performed doping; and an electrochemical doping method wherein the copolymer is immersed in a solution containing a dopant and then doping is carried out electrochemically by the supply of electricity.

Further, the copolymer of the present invention has the property that when it is doped with anion, the nitrogen atom in the polymer bears a positive charge and affords a stable state. Therefore, the copolymer of the invention is stable to the repetition of oxidation and reduction, possesses a high electroconductivity and also possesses an excellent processability as noted previously. These characteristics are utilized to constitute various functional electrodes of batteries, etc.

More specifically, in constituting such electrodes, the copolymer of the present invention can be formed into a desired shape by dissolving it in a solvent, adding a compounding compound, followed by molding, or by molding it in a heat-melted state, or by pressure molding using the copolymer as a min component, or by forming using a binder. As the binder there may be used, for example, polytetrafluoroethylene, polyvinylidene fluoride, polyvinyl chloride, or polyethylene, provided the binder is not always limited to those just exemplified. In this case, there may be used additives, e.g., carbon black, as long as they do not exert a bad influence on the copolymer of the present invention.

Since the copolymer of the present invention is linear, it is superior in processability, making it possible to obtain various shaped articles easily. Moreover, high electroconductivity can be developed by doping the copolymer with an electron acceptor. Besides, the doping is reversible and an extremely high cyclability can be attained. The copolymer is superior as an electroconductive polymer.

The following examples are given to illustrate the present invention more concretely, but it is to be understood that the invention is not limited thereto.

EXAMPLE 1

1.00 g of N,N'-dimethyl-N,N'-diphenyl-p-phenylenediamine was placed in a three-necked 100-ml flask which had been purged with nitrogen, then 15 ml of nitrobenzene and 6 ml of acetic acid were added and dissolved therein, thereafter 120 μl of sulfuric acid and 250 μl of propionaldehyde were added and reaction was allowed to take place at 50° C. for 140 hours under stirring. Thereafter, the reaction solution was poured into 300 ml of ethanol containing 30 ml of NaOH, and the precipitate of reddish brown was filtered, then washed with ethanol and distilled water, followed by drying, to yield 0.85 g of a reddish brown powder. The powder thus obtained was determined for $^1$H-NMR. $^{13}$C-NMR and IR (FIG. 1); as a result, it was found to have the following structure:

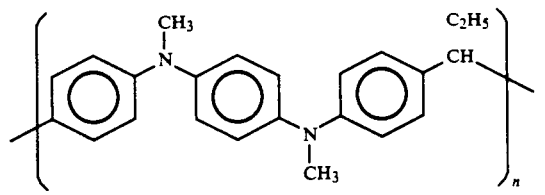

$^1$H-NMR($C_6D_6$):(ppm)  6.82–7.20(m), 3.65(m), 2.97(m), 2.02(m), 0.92(t)

$^{13}$C-NMR($CDCl_3$):(ppm)  147.4, 143.7, 137.4, 128.4, 122.6, 118.6, 51.8, 40.4, 28.9, 12.9

REFERENCE EXAMPLE 1

The copolymer prepared in the above Example was dissolved in chloroform to prepare a solution of the copolymer in chloroform. Then, platinum wire was dipped in the solution to form a thin film of the copolymer on the platinum wire. In this way a measuring electrode was produced.

Then, the electrode was subjected to a cyclic voltametric analysis in a dry nitrogen atmosphere, using a 1M $Et_4NPF_6$ solution of acetonitrile as electrolyte, a platinum plate as a counter electrode and an Ag/AgCl electrode as a reference electrode. A sweep speed of 50 mV/sec was used. The results of the analysis are as shown in FIG. 2. There was no change even in several tens of redox cycles. A reversible and extremely stable redox behavior was exhibited.

EXAMPLE 2

1.00 g of a polymer having the formula

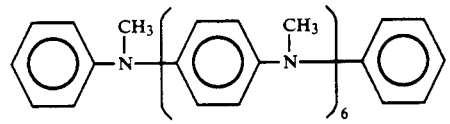

was placed in a three-necked 100-ml flask which had been purged with nitrogen, then 20 ml of nitrobenzene was added and dissolved therein. Thereafter, 100 μl of p-toluenesulfonic acid and 1.2 ml of paraaldehyde were added and reaction was allowed to take place at 80° C. for 3 hours under stirring. Then, the reaction solution was poured into 300 ml of ethanol containing 30 ml of NaOH, and a grayish white precipitate was filtered, washed with ethanol and distilled water and then dried to yield 0.73 g of grayish white powder.

REFERENCE EXAMPLE 2

The copolymer obtained in Example 2 was subjected to a cyclic voltametric analysis in the same way as in Reference Example 1. It exhibited a reversible and extremely stable redox behavior, without any change even in several tens of redox cycles.

EXAMPLE 3

1.00 g of a compound having the formula

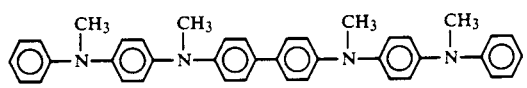

was placed in a three-necked 100-ml flask which had been purged with nitrogen, then 20 ml of nitrobenzene was added and dissolved therein. Thereafter, 110 l of a 1:10 weight ratio mixture of diphosphorus pentoxide and methanesulfonic acid and 1.0 ml of paraaldehyde were added and reaction was allowed to take place at 80° C. for 3 hours under stirring. Then, the reaction solution was poured into 300 ml of ethanol containing 30 ml of NaOH, and a gray precipitate was filtered, washed with ethanol and distilled water and then dried to yield 0.80 g of a grayish white powder.

REFERENCE EXAMPLE 3

The copolymer obtained in Example 3 was subjected to a cyclic voltametric analysis in the same way as in Reference Example 1. It exhibited a reversible and extremely stable redox behavior, without any change even in several tens of redox cycles.

Figure 1:
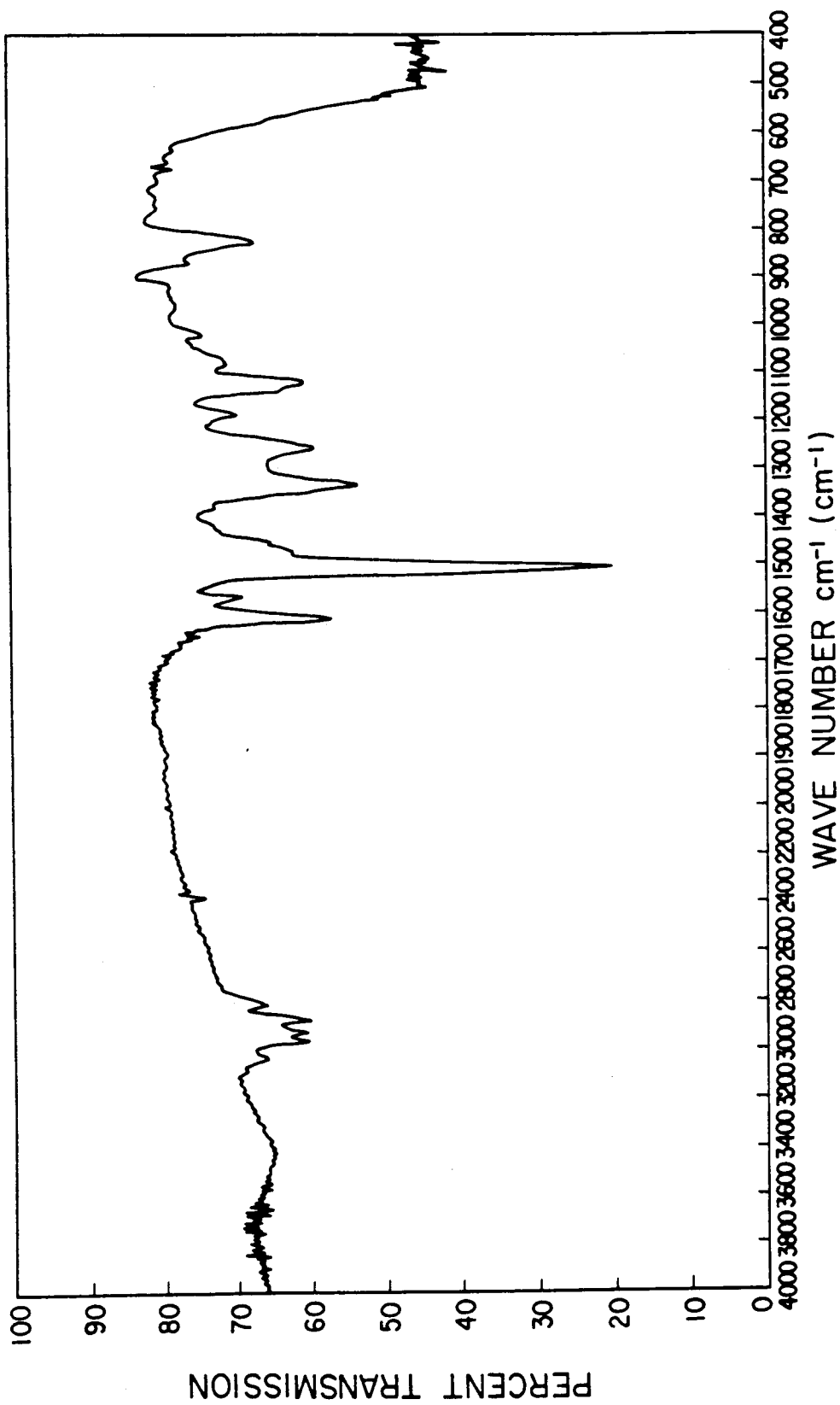
FIG. 1 shows an infrared absorption spectrum of the copolymer obtained in Example.
Figure 2:
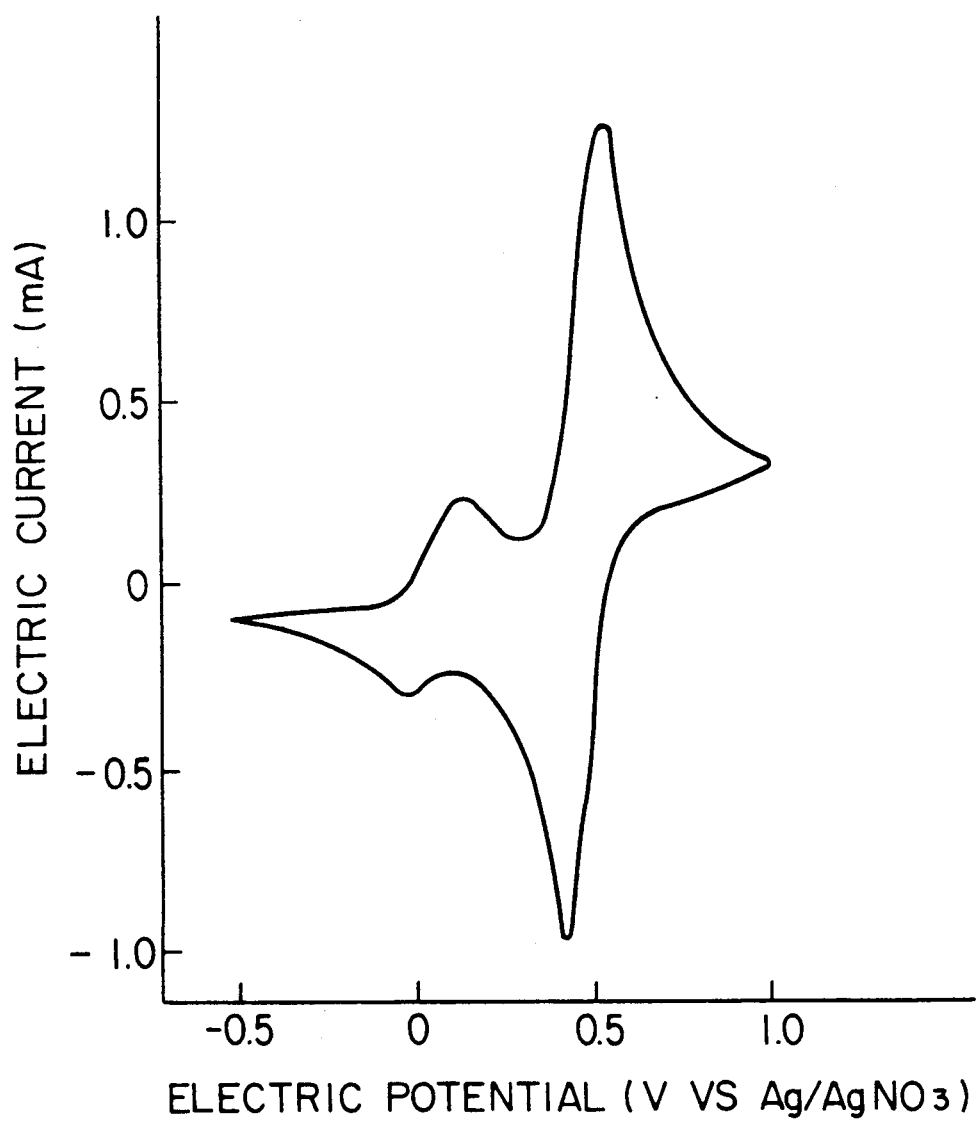
FIG. 2 shows the results of cyclic voltametric analysis of the electrode obtained in Reference Example.

What is claimed is:

1. A copolymer represented by the following general formula (I):

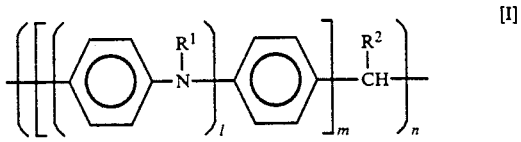

wherein $R^1$ is hydrogen or a hydrocarbon residue having 1 to 20 carbon atoms; $R^2$ is hydrogen, a hydrocarbon residue having 1 to 20 carbon atoms, furyl, pyridyl, nitrophenyl, chlorophenyl, or methoxyphenyl; l is an integer not smaller than 2; m is an integer not smaller than 1; and n is an integer not smaller than 2.

2. A copolymer as set forth in claim 1, wherein l, m and n in the general formula (I) are in the ranges of 2 to 50, to 50 and 2 to 1,000, respectively.

3. An electroactive polymer obtained by doping said copolymer of claim 1 having the general formula (I) with an electron acceptor.

* * * * *

UNITED STATES PATENT AND TRADEMARK OFFICE
CERTIFICATE OF CORRECTION

PATENT NO. : 5,006,633

DATED : April 9, 1991

INVENTOR(S) : Yutaka Shikatani, et al.

It is certified that error appears in the above-identified patent and that said Letters Patent is hereby corrected as shown below:

On the Title page, Section [54]: "COMPOLYMERS" should read as --COPOLYMERS--

Column 4, line 14: "ptoluenesulfonic" should read as --p-toluenesulfonic--

Column 8, line 21, Claim 2: "to 50" should read as --1 to 50--

Signed and Sealed this

First Day of September, 1992

Attest:

DOUGLAS B. COMER

Attesting Officer

Acting Commissioner of Patents and Trademarks